US009051990B2

(12) United States Patent
Helferich

(10) Patent No.: US 9,051,990 B2
(45) Date of Patent: Jun. 9, 2015

(54) VIBRATION-ABSORBING MOUNTING DEVICE

(71) Applicant: Deere & Company, Moline, IL (US)

(72) Inventor: Bernd Helferich, Schifferstadt (DE)

(73) Assignee: DEERE & COMPANY, Moline, IL (US)

( * ) Notice: Subject to any disclaimer, the term of this patent is extended or adjusted under 35 U.S.C. 154(b) by 140 days.

(21) Appl. No.: 13/784,065

(22) Filed: Mar. 4, 2013

(65) Prior Publication Data

US 2013/0241125 A1      Sep. 19, 2013

(30) Foreign Application Priority Data

Mar. 13, 2012   (DE) .................. 10 2012 203 858

(51) Int. Cl.
| F16F 7/00 | (2006.01) |
| F16F 15/08 | (2006.01) |
| B60K 13/04 | (2006.01) |
| F01N 13/18 | (2010.01) |
| F16F 1/373 | (2006.01) |
| F16F 1/44 | (2006.01) |

(52) U.S. Cl.
CPC ............. *F16F 15/08* (2013.01); *B60K 13/04* (2013.01); *F01N 13/1822* (2013.01); *F16F 7/00* (2013.01); *F16F 1/3732* (2013.01); *F16F 1/44* (2013.01); *F16F 2228/08* (2013.01); *F01N 2590/08* (2013.01); *F01N 2530/22* (2013.01)

(58) Field of Classification Search
USPC .................. 267/141, 141.1–141.4, 30, 35; 248/635–638
See application file for complete search history.

(56) References Cited

U.S. PATENT DOCUMENTS

| 4,183,496 | A | * | 1/1980 | Brock et al. .................. 248/638 |
| 4,550,795 | A |   | 11/1985 | Teshima |
| 5,799,930 | A | * | 9/1998 | Willett ........................ 267/141.4 |
| 5,842,677 | A | * | 12/1998 | Sweeney et al. ............. 248/635 |
| 6,394,434 | B2 | * | 5/2002 | Wolf et al. .................... 267/141 |
| 7,416,174 | B2 | * | 8/2008 | Dickson et al. ............ 267/141.1 |

FOREIGN PATENT DOCUMENTS

| DE | 1555606 A1 | 8/1970 |
| DE | 2620521 A1 | 12/1977 |
| DE | 3445491 C1 | 10/1986 |
| EP | 0266656 A2 | 5/1988 |
| EP | 0505325 A1 | 9/1992 |
| JP | 2005120847 A | 5/2005 |
| WO | 9845585 A1 | 10/1998 |

OTHER PUBLICATIONS

German Search Report, dated Oct. 15, 2012 (8 pages).
Deere & Company, "Design Compare" (prior production isolator bracket design), Jun. 5, 2011.
European Search Report, dated Jul. 3, 2013 (6 pages).

* cited by examiner

*Primary Examiner* — Melanie Torres Williams

(57) ABSTRACT

A vibration bearing for a vehicle exhaust system includes an elastic damping element and a pretension device which compresses the elastic damping element radially and axially. A first coupling region is formed on the elastic damping element, and a second coupling region is formed on the pretension device.

9 Claims, 2 Drawing Sheets

VIBRATION-ABSORBING MOUNTING DEVICE

FIELD

The present disclosure relates to a vibration bearing for a vehicle exhaust system.

BACKGROUND

A known vibration bearing for a vehicle exhaust system includes a radially extended elastic damping element and with a pretension device compressing the elastic damping element. A first bracket is attached to the elastic damping element and a second bracket is attached to the pretension device.

Such a vibration bearing is used for example in John Deere Series 6030 agricultural tractors for damping vibrations occurring in an exhaust system. The vibration bearing comprises an oval-shaped rubber body through which is guided axially a threaded rod. On the ends of the threaded rod are screwed two flat lock washers so that the rubber body is held between the lock washers. In the mounted state the first bracket is mounted on the rubber body and the second bracket is screwed to the threaded rod, and the bearing is mounted between a cab of the tractor and a vertically running outlet pipe of the exhaust system. To suppress transmission of vibrations from the outlet pipe to the cab, the rubber body must be sufficiently soft or flexible. This can result in excessive vibrations or resonance oriented in the radial direction.

SUMMARY

According to an aspect of the present disclosure, a vibration bearing is provided with improved damping properties. The vibration bearing for a vehicle exhaust system includes a radially extended elastic damping element and a pretension device compressing the elastic damping element. A first bracket is attached to the elastic damping element and a second bracket is attached to the pretension device. The pretension device compresses the elastic damping element both in the radial and in the axial deflection direction.

The invention uses a targeted compression to imprint a progressive damping force curve on the elastic damping element. To this extent, on the occurrence of vibrations of comparatively low amplitude, the elastic damping element behaves flexibly and hardens increasingly as the amplitudes increase. As the compression takes place both in the radial and in the axial deflection direction, excessive amplitudes of any orientation can be damped or suppressed effectively.

Preferably, the elastic damping element consists of an elastomeric material with a hardness in the range from 20 to 50 Shore A. A value of 25 Shore A has proved ideal with regard to the vibration spectra which typically occur in exhaust systems in agricultural tractors. The elastomeric material for example is a heat-resistant rubber or silicon-rubber mixture. The elastic damping element can be radially symmetrical, in particular an oval-shaped or cylindrical rubber body.

To provide a direction-dependent damping force curve, the elastic damping element can be formed anisotropically with regard to its material properties. Thus for example, in the case of restricted installation room and insofar as spacings must be observed, a greater damping force in certain directions may be desirable to avoid undesirable vibration-induced component collisions. The anisotropy of the material properties can be achieved by targeted addition of suitable additives, for example in the form of soot or similar.

The elastic damping element can be compressed by the pretension device in the radial and axial deflection directions independently of each other, so that damping force curves of differing progression can be predefined for each of the two deflection directions.

The pretension device can in particular comprise two clamping caps which lie on the elastic damping element and can be tensioned to compress the elastic damping element by means of a clamping element extending in the axial deflection direction. In the simplest case the clamping element is a clamping screw which passes axially through the elastic damping element, and on the ends of which the two clamping caps formed as metal mouldings can be screwed by means of associated lock nuts such that the elastic damping element lying in-between can be compressed steplessly.

The clamping caps for example have a bell-shaped or cylindrical inner contour. In the latter case, a protuberance can be provided, formed peripherally along the cylindrical inner contour, and when the clamping caps are applied, this presses in a bead-like manner into a side wall of the elastic damping element. In other words compression of the elastic damping element in the radial deflection direction takes place even on application of the clamping caps, independently of their subsequent tensioning.

With a view to the optimum form- or force-fit, the elastic damping element can have an outer contour corresponding to the inner contour of the damping caps. For example, in the case of a bell-shaped inner contour, an oval-shaped outer contour can be selected, and in the case of a cylindrical inner contour, a cylindrical outer contour.

To simplify the fitting of the vibration bearing under mass production conditions, the clamping caps can be pre-mounted captively by fixed attachment on the elastic damping element. The clamping caps to this end can be vulcanised onto or glued to the elastic damping element.

In addition, the assembly and subsequent adjustment of the vibration bearing can be simplified in that a clamping sleeve passing through the elastic damping element serves as a compression stop for the two clamping caps, wherein the clamping element is guided inside the clamping sleeve. This allows a defined tensioning of the clamping caps without costly adjustment devices.

Possible damage caused by the clamping caps to the elastic damping element which deforms under vibration load can be avoided in particular if the clamping caps have an outer rim along a circumferential edge region protruding over the elastic damping element.

To attach the vibration bearing, the first bracket can be mounted to a radial circumferential recess on the elastic damping element. More precisely, the first bracket has an opening through which the elastic damping element protrudes such that it is held or surrounded by the first bracket by form-fit in the region of the recess. For easier installation, the elastic damping element can comprise a diameter which is reduced in relation to the insertion or mounting direction.

Correspondingly, the second bracket can be attached to a screw neck formed on the pretension device. The screw neck can be an integral part of a clamping element surrounded by the pretension device, for example an extension formed by the clamping screw.

In the mounted state, the vibration bearing is attached by means of the two mounting elements typically between a cabin structure of an agricultural tractor and a vertically running outlet pipe of an exhaust system. The vibration bearing can be arranged between the cabin structure and the outlet pipe such that a transverse movement of the outlet pipe corresponds with a radial deflection direction of the elastic damping element. It should however be noted that the use of the The vibration bearing of the invention is not limited to a specific application and there are no particular requirements with regard to the installation position.

DETAILED DESCRIPTION OF THE DRAWINGS

Figure 1:
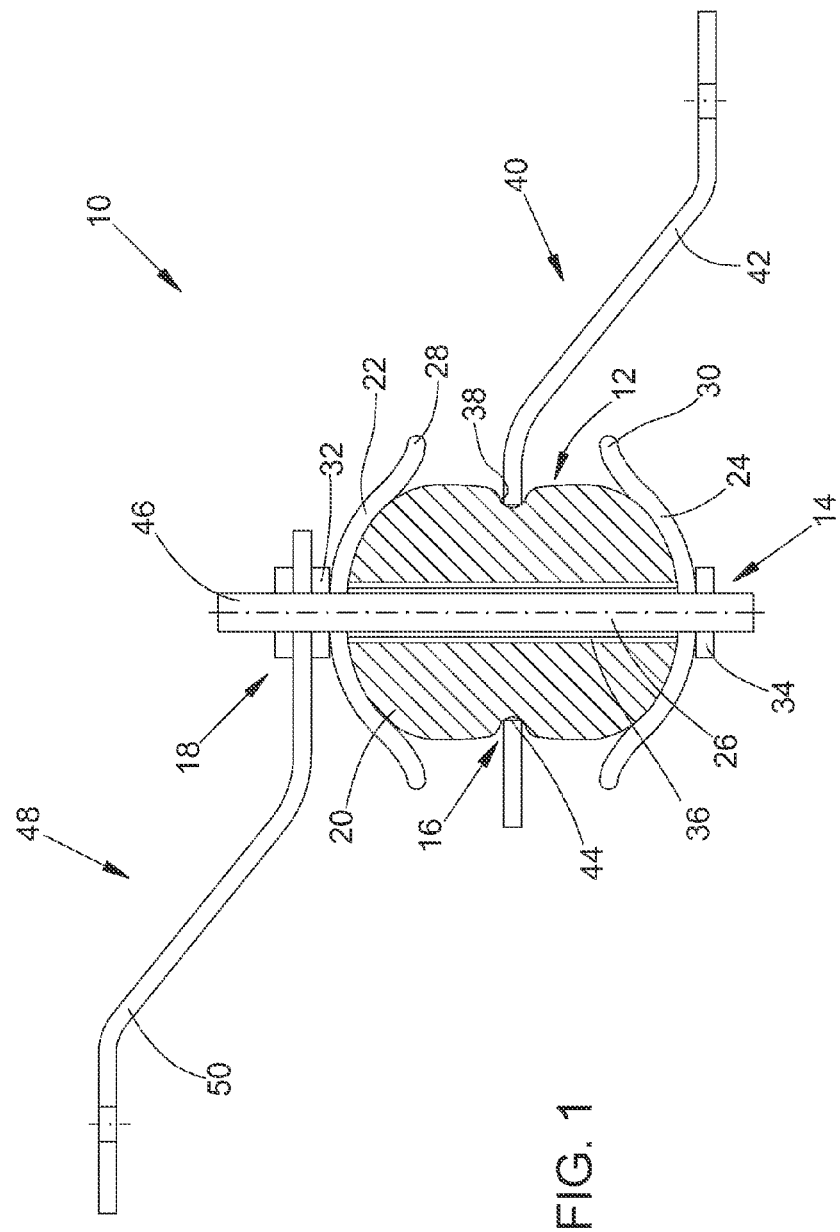
FIG. 1 is a sectional view of a vibration bearing according to the invention.

Referring to FIG. 1, the vibration bearing 10 includes an elastic damping element 12 and a pretension device 14 which compresses the elastic damping element 12. The damping element 12 forms a first coupling region 16, and the pretension device 14 forms a second coupling region 18. The damping element 12 projects radially with respect to a central longitudinal axis.

The elastic damping element 12 has a radially symmetrical, oval-shaped rubber body 20, and is formed of an elastomericic material with a hardness in the region from 20 to 50 Shore A. A value of 25 Shore A has proved ideal with regard to the vibration frequency typically occurring in exhaust systems of agricultural tractors. The elastomeric material is a heat-resistant rubber or silicon-rubber mixture.

The pretension device 14 includes two clamping caps 22, 24 which engage the elastic damping element 12 and which can be tensioned to compress the elastic damping element 12 by means of a clamping element 26 which extends axially through damping element 12. As evident from FIG. 2, the clamping caps 22, 24 have a bell-shaped inner contour corresponding to the oval-shaped outer contour of the elastic damping element 12.

The elastic damping element 12 deforms under vibration load. To avoid possible damage to the elastic damping element 12 caused by the clamping caps 22, 24, the clamping caps 22, 24 have an outer rim along a circumferential edge region 28, 30 which protrudes over the elastic damping element 12.

The clamping element 26 is a clamping screw which passes axially through the elastic damping element 12. Two clamping caps 22, 24 formed as metal mouldings are screwed onto the ends of the clamping element 26 by means of associated lock nuts 32, 34, so that the elastic damping element 12 can be steplessly compressed in both the radial and in the axial direction.

To simplify the installation of the vibration bearing 10 under mass production conditions, the clamping caps 22, 24 are premounted captively by fixed attachment to the elastic damping element 12. The clamping caps 22, 24 to this end are vulcanised onto or glued to the elastic damping element 12.

In addition, a clamping sleeve 36 extends through the elastic damping element 12 and serves as a compression stop which engages the two clamping caps 22, 24. The clamping element 26 is guided inside the clamping sleeve 36. This allows a defined pretension of the clamping caps 22, 24 without costly adjustment devices.

The first coupling region 16 is formed as an annular circumferential recess 38 on the elastic damping element 12. The recess 38 receives a first mounting element 40. More precisely, the first mounting element 40 is a coupling bracket 42 which has an opening 44 which receives the elastic damping element 12, so that the damping element 12 is held or surrounded by the coupling bracket 42 by form-fit in the region of the recess 38. For easier installation, the elastic damping element 12 has a diameter which is reduced in relation to the insertion or mounting direction.

The second coupling region 18 is a screw neck 46 formed on the pretension device 14 for attaching the second mounting element 48. The second mounting element 48 is also a coupling bracket 50. The screw neck 46 is an integral part of the clamping element 26.

In the mounted state, the vibration bearing 10 is attached by the two mounting elements 40, 48 between a cabin structure (not shown) of an agricultural tractor (not shown) and a vertically running outlet pipe (not shown) of an exhaust system (not shown). The vibration bearing 10 is arranged between the cabin structure and the outlet pipe of the exhaust system so that a transverse movement of the outlet pipe corresponds with a deflection of the elastic damping element 12 in a radial direction or perpendicular with respect to the axis of the clamping element 26.

An optional refinement of the vibration bearing 10 provides that the elastic damping element 12 is formed anisotropically with regard to its material properties, to provide a direction-dependent damping force curve. Thus, for example in the case of restricted installation room and insofar as spacings must be observed, a greater damping force in certain directions may be desirable to avoid undesirable vibration-induced component collisions. The anisotropy of the material properties is achieved by targeted addition of suitable additives, for example in the form of soot or similar.

Figure 2:
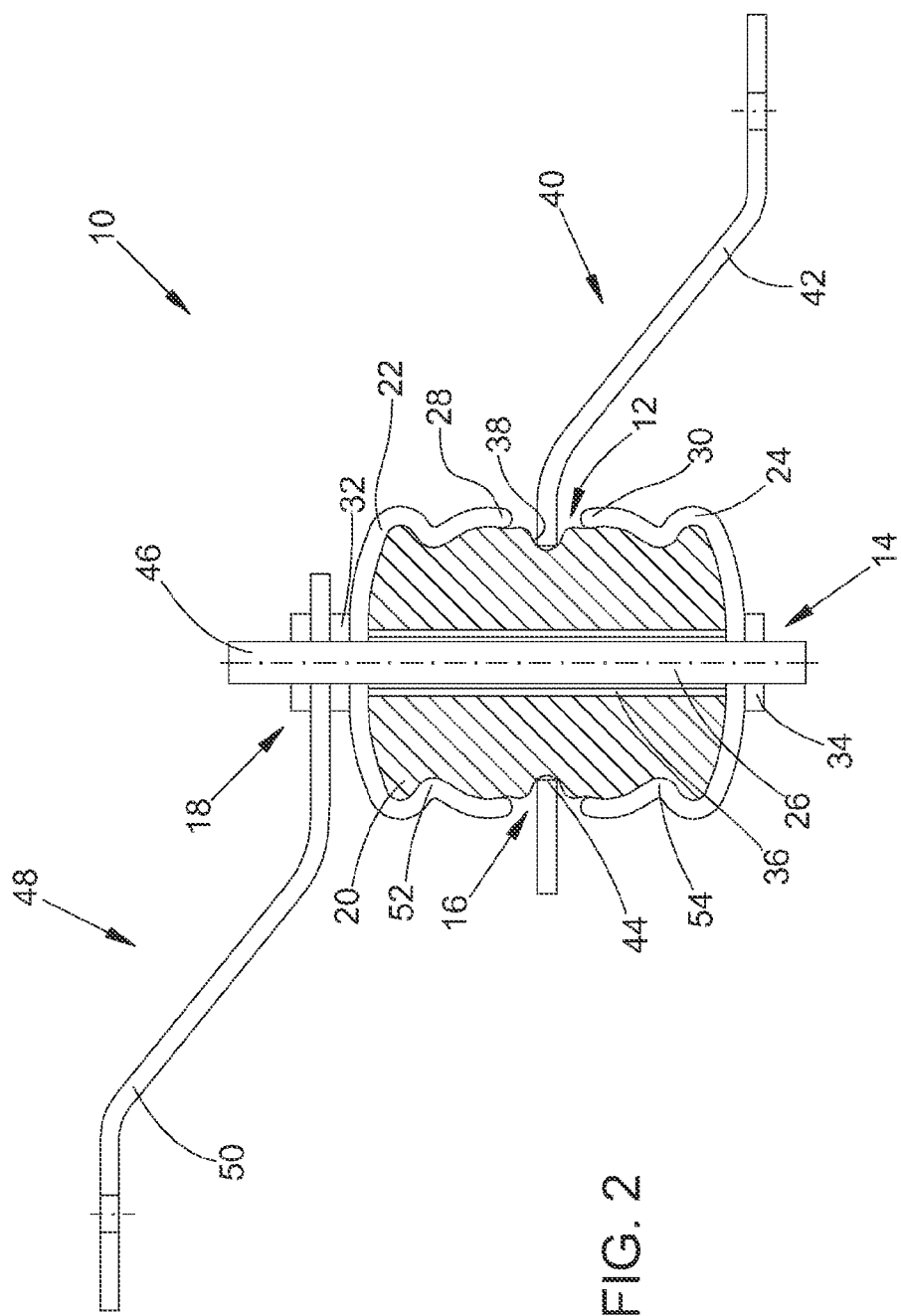
FIG. 2 is a sectional view of a second embodiment of the vibration bearing.

Referring now to FIG. 2, in a second embodiment of the elastic damping element 12, the clamping caps 22, 24 have a cylindrical inner contour corresponding to the cylindrical outer contour of the body 20. The clamping caps 22, 24 form annular protuberances 52, 54 which project radially inwardly.

When the clamping caps 22, 24 are applied, the protuberances 52, 54 press into the outer surface of the elastic damping element 12. In other words the elastic damping element 12 is radially compressed by the clamping caps 22, 24, independently of their subsequent axial compression.

Thus, the elastic damping element 12 can be radially compressed by the pretension device 14 independently of its compression in the axial direction. As a result, damping force curves of differing progression can be predefined for the radial and axial directions.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A vibration bearing for a motor vehicle exhaust system, the bearing having an elastic damping element which projects radially with respect to a longitudinal axis, and a pretension device which compresses the elastic damping element, the bearing having a first coupling region formed by the elastic damping element and a second coupling region formed by the pretension device, characterized in that:

the pretension device compresses the elastic damping element both radially and axially, the pretension device comprises two clamping caps which engage the elastic damping element and a clamping element which extends axially and which moves the clamping caps to compress the elastic damping element, each clamping cap forming an annular protuberance which projects radially inwardly.

2. The vibration bearing of claim 1, wherein:

the elastic damping element consists of an elastomeric material with a hardness in a range from 20 to 50 Shore A.

3. The vibration bearing of claim 1, wherein:

the elastic damping element is compressed by the pretension device axially independently of its radial compression.

4. The vibration bearing of claim 1, wherein:

the elastic damping element has an outer contour corresponding to an inner contour of the clamping caps.

5. The vibration bearing of claim 1, wherein:

the clamping caps are pre-mounted by fixed attachment on the elastic damping element.

6. The vibration bearing of claim 1, wherein:

a clamping sleeve extends through the elastic damping element serves as a compression stop for the two clamping caps.

7. The vibration bearing of claim 1, wherein:

each clamping cap has an outer rim which surrounds a portion of one of the elastic damping elements.

8. The vibration bearing of claim 1, wherein:

the first coupling region is an annular circumferential recess on the elastic damping element which is received by a first mounting element.

9. The vibration bearing of claim 1, wherein:

the second coupling region is a screw neck formed on the pretension device and attached to a second mounting element.

* * * * *